April 28, 1964  J. D. RYAN  3,131,251
MIRROR MOUNTING ASSEMBLY
Filed June 9, 1958  3 Sheets-Sheet 1

INVENTOR.
Joseph D. Ryan
BY Nobbe & Swope
ATTORNEYS

April 28, 1964          J. D. RYAN          3,131,251
MIRROR MOUNTING ASSEMBLY
Filed June 9, 1958          3 Sheets-Sheet 2
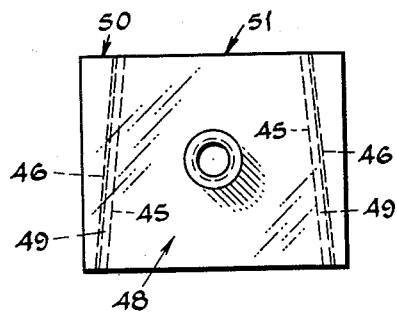
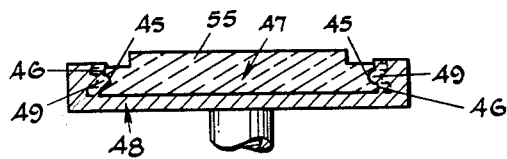
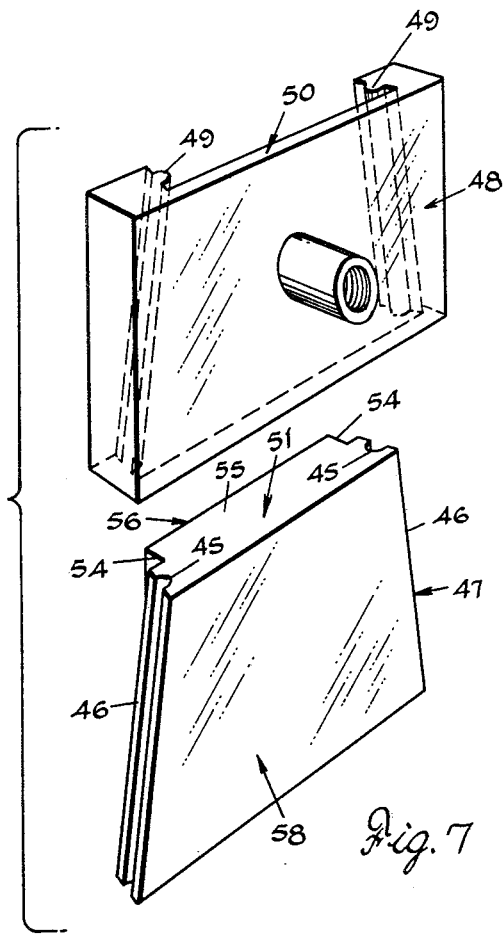
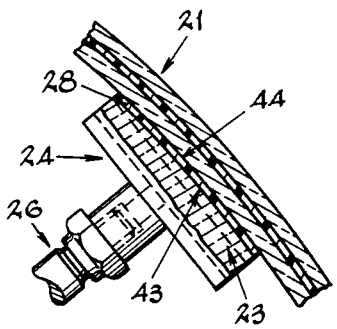
INVENTOR.
Joseph D. Ryan
BY Nobbe & Swope
ATTORNEYS April 28, 1964   J. D. RYAN   3,131,251
MIRROR MOUNTING ASSEMBLY
Filed June 9, 1958   3 Sheets-Sheet 3
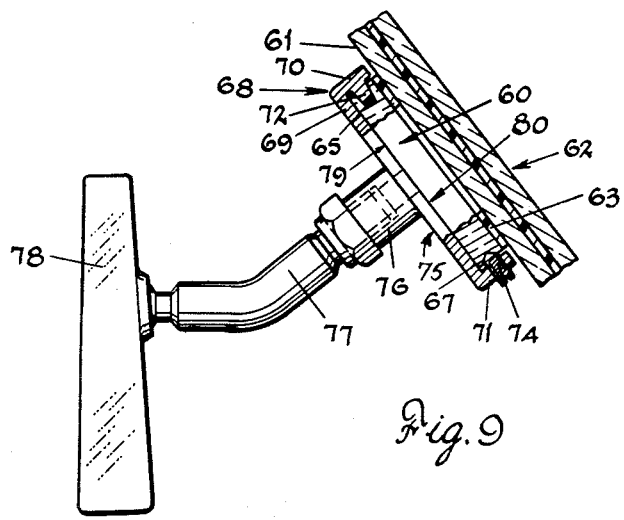
Fig. 9
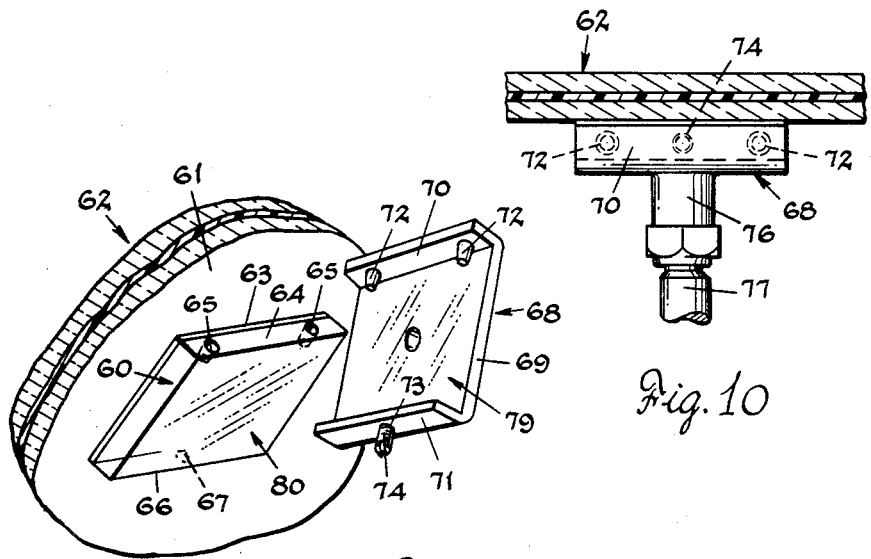
Fig. 10
Fig. 11
INVENTOR.
Joseph D. Ryan
BY Nobbe & Swope
ATTORNEYS

United States Patent Office 3,131,251
Patented Apr. 28, 1964

3,131,251
MIRROR MOUNTING ASSEMBLY
Joseph D. Ryan, Toledo, Ohio, assignor to Libbey-Owens-Ford Glass Company, Toledo, Ohio, a corporation of Ohio
Filed June 9, 1958, Ser. No. 740,825
3 Claims. (Cl. 88—98)

This invention relates broadly to a novel mirror mounting and is more particularly directed to an improved mounting for a rear view mirror that is adapted to affix the mirror to the interior surface of the windshield of an automobile.

It has been found desirable to mount the rear view mirror directly to the windshield of an automobile due, to some extent, to the modern design of the automobile and more particularly because of the increase of the glass viewing area at the front of the car. The mirror mounting brackets, conventionally used, have proven unsatisfactory mainly for the reason that excessively long mounting arms are required to bring the mirror into correct viewing position in front of the driver. These arms would be highly susceptible to car vibrations and hence would interfere with the stability of the image reflected by the rear view mirror. Such a mounting arm would also, as it extended downwardly in front of the windshield, obscure the driver's vision to a highly objectionable degree.

Accordingly, the improved mirror mounting assembly provided by this invention includes a base member affixed directly to the interior surface of a windshield and a mounting member, carrying the reflective mirror, removably associated with the base member. The base member, which in the preferred embodiment is a glass block, cooperates with the mounting member in such a manner that a rear view mirror, carried by the mounting member, is anchored rigidly and in the correct viewing position on the interior surface of the windshield. The two members, constituting along with the rear view mirror, the novel mirror mounting assembly, may be initially independently formed and subsequently assembled together to form the assembly. Thus this mirror mounting assembly affords maximum economy of production, maximum ease of assembly and generally speaking will not hamper, to any appreciable extent, the normal mirror efficiency or windshield construction.

It is therefore a primary object of the present invention to provide a mirror assembly that is durable and at the same time is economical to manufacture and install.

Another object of the present invention is to provide a mirror mounting assembly that will eliminate the use of mounting arms to position the mirror in viewing position.

Another object of the present invention is to provide a mirror mounting assembly that is positioned on the interior surface of the windshield which will afford to the vehicle operator optimum viewing to the rear and which is substantially free of undesirable vibrations.

A further object of the present invention is to provide a mirror mounting assembly in which the mirror proper is carried by a mounting member that is removably associated with a base member affixed directly to a glass windshield.

A still further object of the present invention is to provide a mirror mounting assembly of the above character, wherein the base member may be affixed to the windshield prior to the installation of the windshield in the automobile and the mounting member, carrying the rear view mirror, may be subsequently associated therewith.

Other objects and advantages of the invention will become more apparent during the course of the following description when taken in connection with the accompanying drawings.

In the drawings, wherein like numerals are employed to designate like parts throughout the same:

FIG. 5 is a side elevation of a modification of the present invention with the base member and mounting member assembled;

FIG. 6 is a top elevation of FIG. 5;

FIG. 7 is a perspective view of the modification of FIGS. 5 and 6 showing the members before being joined;

FIG. 8 is a fragmentary sectional view with parts broken away showing a further modification of the present invention;

FIG. 9 is a perspective view of another modification of the present invention with both members assembled;

FIG. 10 is a top elevation of FIG. 9; and

FIG. 11 is a perspective view of the modification of FIGS. 9 and 10 showing the members before being joined.

Figure 1:
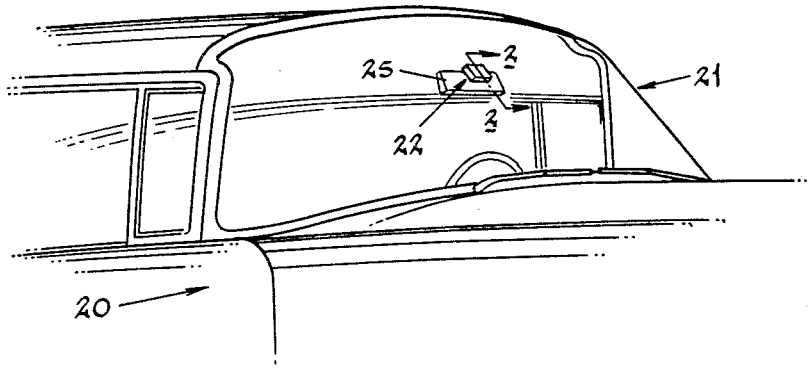
FIG. 1 is a perspective view of a rear view mirror mounting constructed in accordance with this invention and affixed directly to the windshield of an automobile.

Referring now to the drawings and particularly to FIG. 1, there is shown an automobile 20, to the glass windshield 21 of which is mounted the rear view mirror assembly 22. This mirror assembly, positioned on the inner surface of the windshield, affords to the vehicle operator optimum viewing to the rear and is further substantially free of undesirable vibrations. In addition, by reason of its novel interfitting action, the mirror assembly 22 is both durable and economical to install and maintain.

The mirror assembly 22 (FIGS. 2 to 4) is generally composed of two components which includes a first component or base member 23, mounted directly to the glass windshield 21, and a second component or mounting member 24 rigidly, or at least substantially immovably, affixed to the base member or block 23. This second component or mounting member 24 carries the actual reflective means or rear view mirror 25 and the mirror mounting means 26 by which mirror 25 is mounted to member 24. The rear view mirror 25 and its mounting means 26 have been shown and will be described only to the extent believed necessary for a complete understanding of the present invention.

The base member 23 may be secured (FIG. 2) to the interior surface 27 of the windshield 21 through the use of a sheet or layer 28 of polyvinyl butyral resin or other suitable resinous material or adhesive layer either simultaneous with or subsequent to the formation of the windshield.

Figure 4:
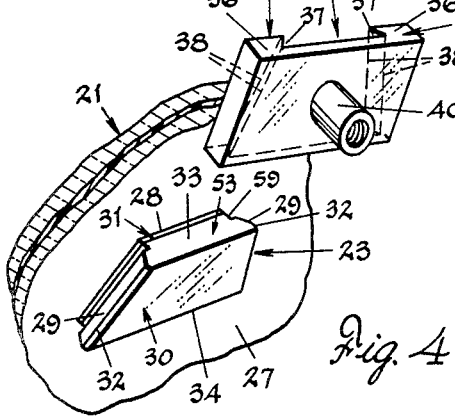
FIG. 4 is a perspective view of the base member and the mounting member before assembly.

Referring now to FIG. 4, the base member 23, which in the preferred embodiment of the invention is a glass block, is trapezoidal in shape and the nonparallel faces 29 are beveled or tapered inwardly from the inner surface 30, with respect to the car interior, towards the outer surface 31 of the block 23. The edges 32, where the nonparallel faces 29 meet the inner face 30, are further rounded for a purpose to be later pointed out. As seen in FIG. 4, the member 23 is normally secured to the inside surface 27 of windshield 21 substantially intermediate the ends of the windshield with the shorter parallel face 33 being directed upwardly towards the car roof or top edge of the windshield and the longer parallel face 34 therefore being in the lower position towards the bottom edge of the windshield.

Figure 3:
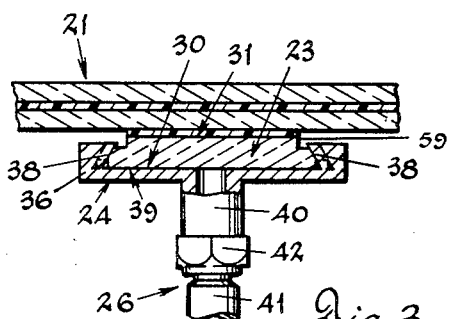
FIG. 3 is a fragmentary sectional view taken along line 3—3 of FIG. 2.

The mounting member 24 is preferably metallic and in a preferred embodiment is a cast metal, although other suitable metals or plastics either cast, molded or machined could be used. This mirror mounting or supporting member 24 has a shaped recess or cutout 35, which is of substantially the same trapezoidal shape and size as the outline of block 23. This cutout 35 is formed by machining or cutting away part of the end portions 36 of member 24 to form V-shaped slots 37 which expose inclined interior bearing faces 38, in ends 36, bordering cutout 35. Each of these faces 38 is beveled, or inwardly tapered with respect to the windshield, at the same angle as nonparallel faces 29 of block 23. Therefore these faces 38, when member 24 is slidably received on member 23, will bear against the nonparallel faces 29, both faces 38 and 29 being inclined at the same angle and shaped so as to be parallel to each other, as above described, when the mirror mounting assembly 22 is assembled. The V-shaped grooves 37 thus will grip, as seen in FIG. 3, or clamp over the nonparallel faces 29, when the member 24 is forced down over member 23, so that faces 29 and 38 are maintained in interfitting or bearing engagement. This interlocking will substantially eliminate any rocking, longitudinal or lateral movement of either base member 23 or mirror supporting member 24, relative to each other, when they are joined to form stationary mirror mounting assembly 22. It has been found desirable to round the edge 32, as hereinbefore described, in order to prevent any chipping of member 23 at or along the edges 32 where a great deal of the stress of the wedge mounting would normally occur. If desired, a suitable thermoplastic adhesive could be placed either in the opening between each face 29 and 38 exposed by rounding edges 29 as at 32, on the outwardly directed surface 39 of member 24 or on the inwardly directed juxtaposed surface 30 of member 23 to provide a bond between these two members to overcome vibration between the members.

Figure 2:
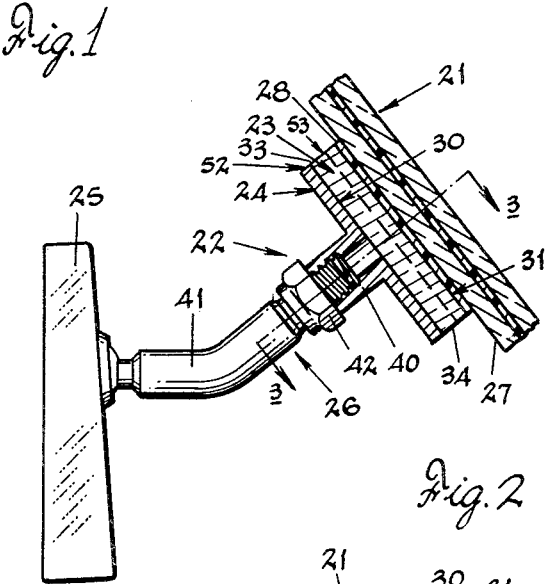
FIG. 2 is a sectional view taken along the line 2—2 of FIG. 1.

Thus, it is seen that a mirror mounting member 24, carrying the rear view mirror 25, and having a cutout 35, may be slid down from its position, shown in FIG. 4, onto the second member 23, previously affixed to a windshield 21 and by the gripping action of the V-shaped cutout 37, will be wedged onto the member 23 to form the assembly 22 illustrated in FIG. 2. Mounting member 24 may be provided with an internally threaded bore or hub 40 to receive an externally threaded shaft 41 locked to the second member by means of a conventional locking nut 42. This shaft 41, by any suitable means, may have mounted on its opposite extremity the reflective mirror 25, and since this shaft does not bear against the glass itself it could be formed from any desirable material, for example, metal, aluminum, plastic, etc. It should be understood, however, that any suitable mounting means 26 might be used to lock the mirror 25 to the member 24 and that such a mounting could be of any desired shape. For example, the mirror mounting means 26 might be independently formed and by any suitable means, such as inset screws, mounted to this member 24.

From the above, it will be seen that there is provided a novel mirror mounting assembly 22, adapted to mount the rear view mirror 25 for an automobile to a glass windshield 21 and which in the preferred embodiment, is composed of a glass block 23 and a metallic member 24 easily joined, one to another, by the wedging action and cooperating interlocking of the two members, as above described. Having described the visible structural features, it is now believed to be most important to point out a number of important advantages which are gained by use of this novel mirror mounting assembly.

The present mirror mounting assembly consists essentially of two components, one component of which (i.e. base member 23) can be secured to the windshield at or about the time the windshield is fabricated and the second component of which (i.e. mounting member 24) can be associated with the first component at any subsequent time. The glass block 23, or first component, may be mounted by a bonding interlayer 28 to the windshield 21 at the same time or just subsequent to the forming of windshield 21.

Additionally, the block 23 is of substantially small thickness, and therefore does not project upwardly from the surface of the windshield to any appreciable extent. However, if a one-piece unitary assembly was mounted to the windshield, and if such a mounting included a mirror mounting bracket, a substantial portion of which projected well above the surface of the windshield to which it was mounted, a most serious disadvantage would arise. This upstanding projection would mean that a substantially reduced number of windshields could be shipped as compared to the number of conventional windshields that may presently be shipped. This introduces a most undesirable limitation to hamper the handling of the windshield, however, this disadvantage is not present when using the novel two component mounting above described. This follows since there is only a slight projection from the plane of the windshield by the relatively thin block 23 and therefore there would be no appreciable reduction in the number of windshields which might be placed in a carton or carrier as compared to the number presently carried.

A further important advantage of this novel mounting is achieved by standardizing the mounting components, especially base member 23. Since mounting member 24 may have inscribed or affixed to its surface 39 a decoration or car identifying emblem, by reason of the standardization of the size and relationship of members 23 and 24, the type of emblem appearing on surface 39 will not require any separation of the winshields by car identity. This is an important consideration because, if for example, the different models are to be identified by different designs, and all of these models use the same class of windshield, all of the windshields could have a similar block 23 mounted thereon and there would be no need to keep the windshields separated to insure that the correct windshield, having the proper emblem, is mounted on the correct model car. This standardization of mounting assembly therefore has important advantages for a car manufacturer who puts out a number of different models and who might desire to add distinctiveness to each model by providing mirror identification. It is understood that the emblems would be visible to anyone approaching the vehicle since the block 23 is transparent as is likewise the adhesive bonding interlayer 28. Any emblem on surface 39 therefore would be viewed through the windshield 21, interlayer 28 and block 23.

A further important advantage of the mounting is that there are no bolts, screws or metallic parts bearing upon the windshield 23. Also the replacement problem if damage occurs to the mirror, is greatly simplified since there are no metallic components immovably mounted in or to the block 23 or to the windshield. Should the reflective means or mirror 25 be damaged, member 24 need only be raised or slid off the block 23 and a complete new unit substituted. If a single piece assembly was used, for example, if the block 24 carried mirror 25 and was rigidly affixed to the windshield and damage occurred to the mirror 25, considerable time and expense would be required to replace the entire unit and could possibly require replacement of the entire windshield 21.

Referring now to FIG. 8 there is shown a modification of the present invention wherein the outwardly directed surface 31 of block 23 is curved to follow the contour of the windshield so that maximum selectivity of the windshield mounting position of block 23 is afforded. This feature is of paramount importance since with the constant design change of the curvature of the windshield and the lowering of the car roof, it might become necessary to mount the mirror at a pronounced bend in the windshield. As seen in FIG. 8, the surface 43 of block 23 has a crown contoured to substantially match the curvature of surface 44 of the windshield 21.

FIGS. 5, 6 and 7 illustrate a modification of the mounting shown in FIGS. 1 through 4, wherein concave grooves 45 have been molded into or cut out of the nonparallel and inclined surfaces 46 (identical with surfaces 29 hereinbefore discussed) of the block 47 (similar to block 23). The member 48 (similar to member 24) has suitable ridges, ribs or guide projections 49 that would be received into the grooves 45 when the mounting member 48 was slid down and onto member 47 to be positioned as substantially shown in FIG. 6 in the same manner as hereinbefore described for the modification of FIGS. 2 to 4.

Referring specifically to FIG. 5, it is seen that the upper surface 50 of member 48 and the upper surface 51 of the block 47, when these two members are assembled, would lie in substantially the same horizontal plane. This would likewise be true for the surfaces 52 and 53 of members 23 and 24 (FIGS. 2 to 4). Thus would be formed, in both the modification of FIGS. 2 through 4 and FIGS. 5 through 7, a mounting assembly which would give, when viewed from the front, a pleasing appearance. It should be understood, however, that should any other shape, design, form or outline be desired, the general dimensions of the members 23 and 24 and members 47 and 48 can be altered as dictated by either design requirements, windshield contour or structural strength as long as the basic wedging interfitting of the two components, above described, remains unaltered.

Referring particularly now to FIG. 7, it will be noted that the block 47 is cut away at 54, on each side in the nonparallel faces 46, to form a mounting extension 55. The surface 56 of the extension 55, which is directed towards the glass winshield 21 and which actually contacts the interlayer of adhesive bonding layer 28 is therefore raised with respect to the edge face 46. This extension 55 is often desirable when a crown, such as that shown in FIG. 8, is necessary because the mirror is to be mounted at a curve in the windshield. However, when such a crown is not required, the cutout 54 could be eliminated and the block 46 might have a straight taper, except for cutouts 45, upon moving from the inner face 58 to the outer face 56. Such a construction could likewise be followed in the modification of FIGS. 1 through 4 and the raised block extension 59 eliminated.

Thus it is seen that an interlocking two component or member mirror mounting assembly has been provided, one component of which may be initially mounted directly to the windshield and a second component, carrying the reflective mirror, which may be slidably received onto this first component. These two components interlock to provide a mirror mounting having all of the necessary structural strength, which will at the same time provide maximum economy as to cost of manufacture, cost of installation, cost of maintenance and cost of replacement as well as provide efficient viewing.

An important consideration in the choice of material of which the block 23 is to be composed is the requirement that if materials other than glass are to be used the coefficient of expansion of such material must be substantially the same as, or closely matched to the coefficient of expansion of the windshield glass. If the coefficients of expansion between the materials composing the block and the windshield are not approximately matched then when the block 23 is cooled to about −35° F., a strain is likely to be induced on the bond between the two members and could result in a shattering of the windshield glass in the bonding area.

Referring now to FIGS. 9 through 11 there is shown a further modification of the mounting assembly wherein base member 60 (similar to block 23) is mounted to the interior surface 61 of a windshield 62 through the medium of interlayer 63, as hereinbefore described. This base member 60 is substantially, as shown, rectangular and has at least two parallel edges. In the upper exposed face edge 64 there are two recesses or grooves 65 while in the downwardly directed face edge 66 there is a single recess or groove 67.

The mounting member 68 (similar to member 24) is U-shaped and has a substatnially flat intermediate portion 69 and two upstanding end walls 70 and 71. One end wall 70 has two downwardly directed lugs 72 shaped to conform to the size and shape of the cooperating recesses 65. In the embodiment shown, the lugs 72 are tapered downwardly and shaped as a cone in order to obtain a good frictional bond between members 60 and 68. When lugs 72 are inserted in to recesses 65, as will later be described, to mount member 68 onto or over member 60, an opening 73 in end wall 71 of member 68 will be coincident with the recess 67 in member 60. The opening 73 is further threaded to receive a set screw 74.

Mounted on the outwardly directed face 75 (FIG. 9) of member 68 is a hub or other journal bearing 76 adapted to receive the support shaft 77 carrying the reflective means 78. As hereinbefore pointed out any suitable attachment means might be provided to support the reflecting means 78 from the member 68.

After base member 60 is fixedly attached to the interior surface 61 of windshield 62, the mounting member 68 is slid or placed over the base member and fitted thereon by inserting lugs 72 into recesses 65. The member 68 is allowed to swing downwardly so that the surface 79 of intermediate portion 69 of member 68 will lie flush against the surface 80 of member 60. This is most clearly seen in FIGS. 9 and 11. When member 68 is so positioned with respect to member 60, the end wall 71 rides flush against the surface 66 of member 60 so that openings 73 and 67 respectively in each are coincident. At this time the set screw 74 would be inserted into the opening 73 and screwed inwardly so that it enters into recess 67 in member 60 as seen in FIG. 9. Thus member 68 is locked against the member 60 and fixedly joined thereto so that the two members, i.e. 60 and 68, are mounted to be substantially free of vibrations, one relative to the other, and both relative to the windshield.

It is to be understood that the form of the invention disclosed herein is to be taken as the preferred embodiment thereof, and that various changes in the shape, size and arrangement of parts as well as various procedural changes may be resorted to without departing from the spirit of the invention or the scope of the following claims.

I claim:

1. Means for mounting a rear view mirror, having a mirror reflecting element, upon the interior surface of an automobile windshield, with said mirror reflecting element being supported in viewing position and held in a substantially vibration-free position between the windshield and the driver of the automobile to afford the driver with a substantially undistorted and unobstructed view of road conditions to the rear of the automobile, the improvement which comprises mounting means including a rigid base member having a continuous surface of relatively large area rigidly bonded over said area to the interior surface of the windshield so that it is immobile with respect to said windshield, a mounting member fitted over and detachably carried by said base member, and means for mounting said reflecting element upon said mounting member, said base member being provided with opposed nonparallel faces inclined at an angle to the windshield, and said mounting member being provided with V-shaped grooves exposing opposed bearing surfaces which are inclined relative to the windshield at the same angle as the nonparallel faces of said base member, said nonparallel faces of said base member and said exposed bearing surfaces of said mounting member being in bearing engagement to restrain movement of said base member and mounting member relative to one another when said mounting member is wedged onto said base member.

2. Means for mounting a rear view mirror, having a mirror reflecting element, upon the interior surface of an automobile windshield with said mirror reflecting element being supported in viewing position and held in a substantially vibration-free position between the windshield and the driver of the automobile to afford the driver with a substantially undistorted and unobstructed view of road conditions to the rear of the automobile, the improvement which comprises mounting means including a rigid base member having a continuous surface of relatively large area rigidly bonded over said area to the interior surface of the windshield so that it is immobile with respect to said windshield, a mounting member fitting over and detachably carried by said base member, and means for mounting said reflecting element upon said mounting member, said base member being provided with opposed nonparallel faces each of which has a concave groove therein extending the full length of said face, said mounting member having V-shaped grooves therein exposing opposed bearing surfaces, and guide ridges on each bearing surface of said mounting member, said guide ridges being received in the concave grooves in the base member to restrain movement of said base member and said mounting member relative to one another when said mounting member is fitted over said base member.

3. Means for mounting a rear view mirror, having a mirror reflecting element, upon the interior surface of an automobile windshield, with said mirror reflecting element being supported in viewing position and held in a substantially vibration-free position between the windshield and the driver of the automobile to afford the driver with a substantially undistorted and unobstructed view of road conditions to the rear of the automobile, the improvement which comprises mounting means including a rigid base member having a continuous surface of relatively large area rigidly bonded over said area to the interior surface of the windshield so that it is immobile with respect to said windshield, a mounting member fitted over and detachably carried by said base member, and means for mounting said reflecting element upon said mounting member, said base member being provided with at least two recesses in its upper face, said mounting member being substantially U-shaped and having two end walls and an intermediate portion extending between said end walls and a pair of lugs downwardly extending from one of said end walls adapted to register with the recesses in said base member upon assembly of said mounting member to said base member and means for locking said mounting member to said base member when the two members are assembled.

References Cited in the file of this patent

UNITED STATES PATENTS

| | | |
|---|---|---|
| 1,513,769 | Sullivan | Nov. 4, 1924 |
| 1,610,305 | Muncie | Dec. 14, 1926 |
| 1,871,877 | Buckman | Aug. 16, 1932 |
| 1,909,526 | Falge et al. | May 16, 1933 |
| 1,949,138 | Bell | Feb. 27, 1934 |
| 2,057,611 | Fischer | Oct. 13, 1936 |
| 2,091,203 | Hay | Aug. 24, 1937 |
| 2,146,859 | Seklehner | Feb. 14, 1939 |
| 2,168,003 | Stone | Aug. 1, 1939 |
| 2,299,320 | Hallenscheid | Oct. 20, 1942 |
| 2,549,766 | Benson | Apr. 24, 1951 |
| 2,569,622 | Trainor | Oct. 2, 1951 |
| 2,750,142 | McKee | June 12, 1956 |

FOREIGN PATENTS

| | | |
|---|---|---|
| 529,288 | Belgium | June 30, 1954 |